United States Patent
Tran et al.

(10) Patent No.: US 11,222,409 B2
(45) Date of Patent: Jan. 11, 2022

(54) IMAGE/VIDEO DEBLURRING USING CONVOLUTIONAL NEURAL NETWORKS WITH APPLICATIONS TO SFM/SLAM WITH BLURRED IMAGES/VIDEOS

(71) Applicant: NEC Laboratories America, Inc., Princeton, NJ (US)

(72) Inventors: Quoc-Huy Tran, Santa Clara, CA (US); Bingbing Zhuang, Sunnyvale, CA (US); Pan Ji, San Jose, CA (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 0 days.

(21) Appl. No.: 16/867,805

(22) Filed: May 6, 2020

(65) Prior Publication Data

US 2020/0372614 A1 Nov. 26, 2020

Related U.S. Application Data

(60) Provisional application No. 62/851,259, filed on May 22, 2019.

(51) Int. Cl.
*G06T 5/00* (2006.01)
*G06T 7/50* (2017.01)
*G06N 3/04* (2006.01)

(52) U.S. Cl.
CPC ........... *G06T 5/003* (2013.01); *G06N 3/0454* (2013.01); *G06T 7/50* (2017.01); *G06T 2207/10028* (2013.01); *G06T 2207/20081* (2013.01); *G06T 2207/20084* (2013.01)

(58) Field of Classification Search
CPC . G06T 5/003; G06T 7/50; G06T 2207/10028; G06T 2207/20081; G06T 2207/20084; G06T 2207/20201; G06N 3/0454; G06N 3/08
See application file for complete search history.

(56) References Cited

U.S. PATENT DOCUMENTS

| | | | |
|---|---|---|---|
| 9,955,070 B2* | 4/2018 | Lelescu | G06T 7/20 |
| 10,949,649 B2* | 3/2021 | Walker | G06T 7/74 |
| 11,107,205 B2* | 8/2021 | Hu | G06N 3/0454 |
| 2008/0232707 A1* | 9/2008 | Lee | G06T 5/10 382/255 |
| 2018/0121767 A1* | 5/2018 | Wang | G06K 9/6256 |
| 2019/0026869 A1* | 1/2019 | Gupta | G06T 5/003 |
| 2020/0051206 A1* | 2/2020 | Munkberg | G06T 5/002 |

(Continued)

OTHER PUBLICATIONS

Zhou, T., et al., "Unsupervised Learning of Depth and Ego-Motion from Video," arXiv:1704.07813v2 [cs.CV], Aug. 2017.*

(Continued)

*Primary Examiner* — Xuemei G Chen
(74) *Attorney, Agent, or Firm* — Joseph Kolodka

(57) ABSTRACT

A method for correcting blur effects is presented. The method includes generating a plurality of images from a camera, synthesizing blurred images from sharp image counterparts to generate training data to train a structure-and-motion-aware convolutional neural network (CNN), and predicting a camera motion and a depth map from a single blurred image by employing the structure-and-motion-aware CNN to remove blurring from the single blurred image.

20 Claims, 6 Drawing Sheets

(56) References Cited

U.S. PATENT DOCUMENTS

| | | | | |
|---|---|---|---|---|
| 2020/0265590 A1* | 8/2020 | Daniilidis | ............ | G06N 3/0454 |
| 2020/0330028 A1* | 10/2020 | Nejati | .................. | G06N 3/0454 |
| 2021/0166350 A1* | 6/2021 | Wang | ...................... | G06T 5/003 |

OTHER PUBLICATIONS

Pei, Y., et al., "Effects of Image Degradations to CNN-based Image Classification," arXiv:1810.05552v1 [cs.CV], Oct. 2018.*

Tim Brooks et al., "Learning to Synthesize Motion Blur", arXiv:1811.11745vl. Nov. 27, 2018, pp. 2-4; and figures 1-4.

Liyuan Pan et al., "Single Image Deblurring and Camera Motion Estimation with Depth Map", arXiv:1903.00231v1, Mar. 1, 2019, p. 1.

Bae et al., "Accurate Motion Deblurring using Camera Motion Tracking and Scene Depth", 2013 IEEE Workshop on Applications of Computer Vision (WACV). Jan. 15, 2013. (pp. 148-153.).

He et al., "Deep Residual Learning for Image Recognition", Proceedings of the IEEE conference on computer vision and pattern recognition 2016. (pp. 770-778).

Hu et al., "Joint Depth Estimation and Camera Shake Removal from Single Blurry Image", Proceedings of the IEEE Conference on Computer Vision and Pattern Recognition 2014. (pp. 2893-2900.).

Lee et al., "Simultaneous Localization, Mapping and Deblurring", 2011 International Conference on Computer Vision. Nov. 6, 2011. (pp. 1203-1210.).

Nimisha et al., "Semi-Supervised Learning of Camera Motion from a Blurred Image", 2018 25th IEEE International Conference on Image Processing (ICIP). Oct. 7, 2018. (pp. 803-807.).

Mayer et al., "A Large Dataset to Train Convolutional Networks for Disparity, Optical Flow, and Scene Flow Estimation", Proceedings of the IEEE Conference on Computer Vision and Pattern Recognition 2016. arXiv:1512.02134v1 [cs.CV] Dec. 7, 2015. (pp. 1-14.).

Yue et al., "High-Dimensional Camera Shake Removal With Given Depth Map", IEEE Transactions on Image Processing. vol. 23, No. 6. Jun. 2014 (pp. 2688-2703.).

* cited by examiner

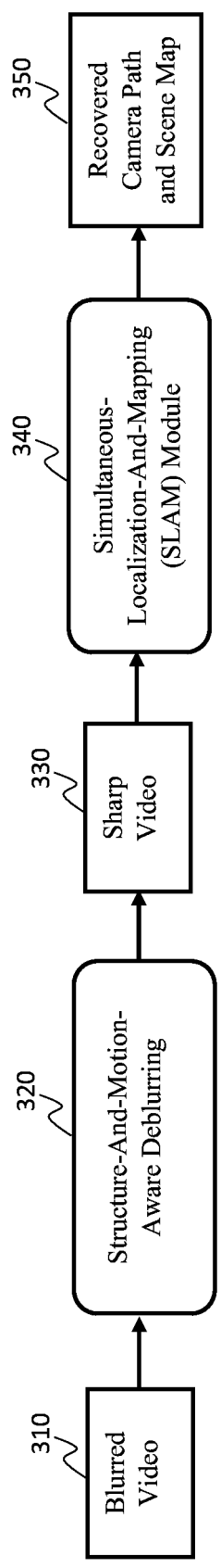
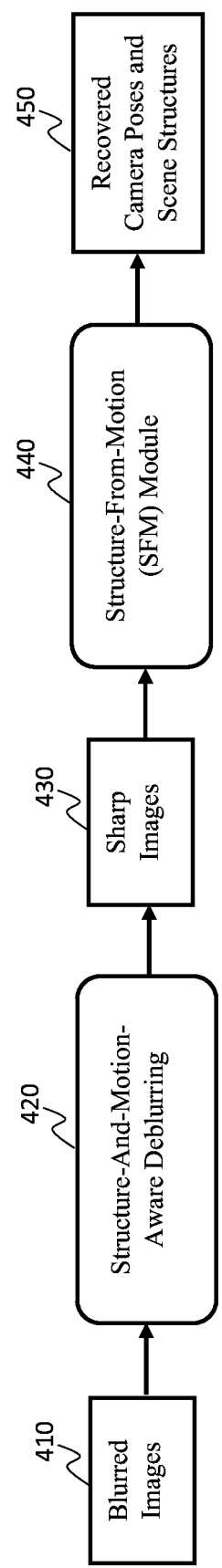
FIG. 3
FIG. 4

IMAGE/VIDEO DEBLURRING USING CONVOLUTIONAL NEURAL NETWORKS WITH APPLICATIONS TO SFM/SLAM WITH BLURRED IMAGES/VIDEOS

RELATED APPLICATION INFORMATION

This application claims priority to Provisional Application No. 62/851,259, filed on May 22, 2019, the contents of which are incorporated herein by reference in their entirety.

BACKGROUND

Technical Field

The present invention relates to learning structure-and-motion-aware deblurring and, more particularly, to a convolutional neural network (CNN)-based method which learns the underlying geometry from a single blurred image and where blurred image correction is performed.

Description of the Related Art

Motion blur due to camera shake is a common problem in photography, especially in conditions involving zoom and low light. Merely pressing a shutter release button on the camera can in and of itself cause the camera to shake, and unfortunately cause blurred images. This issue is especially prevalent in digital photography, where lightweight cameras with automated exposure times are not easily stabilized are common, and where automated exposure times often necessitate relatively long stabilization to ensure a non-blurred image. The compact form and small lenses of many of these cameras only serves to increase this problem.

The sensor of a digital camera creates an image by integrating energy over a period of time. If during this time, the exposure time, the image moves, either due to camera or object motion, the resulting image will exhibit motion blur. The problem of motion blur is increased when a long focal length (zoom) is employed, since a small angular change of the camera creates a large displacement of the image, and in situations when long exposure is needed, either due to lighting conditions, or due to the use of small aperture.

SUMMARY

A computer-implemented method for correcting blur effects is presented. The method includes generating a plurality of images from a camera, leveraging the depth map to synthesize blurred images from sharp image counterparts to generate training data, training a structure-and-motion-aware convolutional neural network (CNN), and predicting a camera motion and a depth map from a single blurred image by employing the structure-and-motion-aware CNN to remove blurring from the single blurred image. The method is more geometrically faithful than existing methods as it leverages depth to synthesize realistic blur for training and during inference explicitly reasons the underlying geometry that causes the blur.

A non-transitory computer-readable storage medium comprising a computer-readable program is presented for correcting blur effects, wherein the computer-readable program when executed on a computer causes the computer to perform the steps of generating a plurality of images from a camera, synthesizing blurred images from sharp image counterparts to generate training data to train a structure-and-motion-aware convolutional neural network (CNN), and predicting a camera motion and a depth map from a single blurred image by employing the structure-and-motion-aware CNN to remove blurring from the single blurred image.

A system for correcting blur effects is presented. The system includes a memory and one or more processors in communication with the memory configured to generate a plurality of images from a camera, synthesize blurred images from sharp image counterparts to generate training data to train a structure-and-motion-aware convolutional neural network (CNN), and predict a camera motion and a depth map from a single blurred image by employing the structure-and-motion-aware CNN to remove blurring from the single blurred image.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is a block/flow diagram of an application of the deblurring method to simultaneous localization and mapping (SLAM) with blurred videos, in accordance with embodiments of the present invention;

FIG. 4 is a block/flow diagram of an application of the deblurring method to structure from motion (SFM) with blurred images, in accordance with embodiments of the present invention;

DETAILED DESCRIPTION OF PREFERRED EMBODIMENTS

In view of blurring effects, the exemplary embodiments introduce a Convolutional Neural Network (CNN)-based method which learns the underlying geometry (e.g., camera motion and scene structure) from just a single blur image and blur image correction is performed. The method is referred to as a structure-and-motion-aware blur correction method.

The exemplary embodiments introduce a novel CNN architecture for estimating and removing blur effects due to intra-frame camera motion in a single input blurred image. Moreover, the exemplary embodiments introduce a novel blurred image synthesization procedure, which generates a large number of blurred images for training the CNN. Finally, the exemplary embodiments depict practical applications pertaining to structure from motion and simultaneous localization and mapping (SFM/SLAM) with blurred images/videos.

The image deblurring pipeline includes non-uniform blur kernel estimation and non-blind deblurring with the estimated blur kernel. By "non-uniform blur kernel" it is meant that a linear blur kernel is estimated for each pixel individually. Since the blur kernel is mostly determined by the scene depth and intra-frame camera motion, to respect such underlying geometry, the exemplary embodiments introduce a structure-and-motion-aware CNN to explicitly estimate both intra-frame camera motion and depth map from just a single input blurred image.

The depth and motion obtained are then used to compute the linear blur kernel and perform standard non-blind deblurring. On the other hand, in order to obtain a large-scale dataset of diverse and realistic blurred images for training the CNN, the exemplary embodiments introduce a novel structure-and-motion-aware blur synthesization pipeline, which exploits both camera motion and depth map to compute per-pixel linear blur kernels, which are further applied to generate blur in the image by simple convolution. Finally, the exemplary embodiments of the present invention apply the exemplary approach to SFM/SLAM with blurred images/videos.

Figure 1:
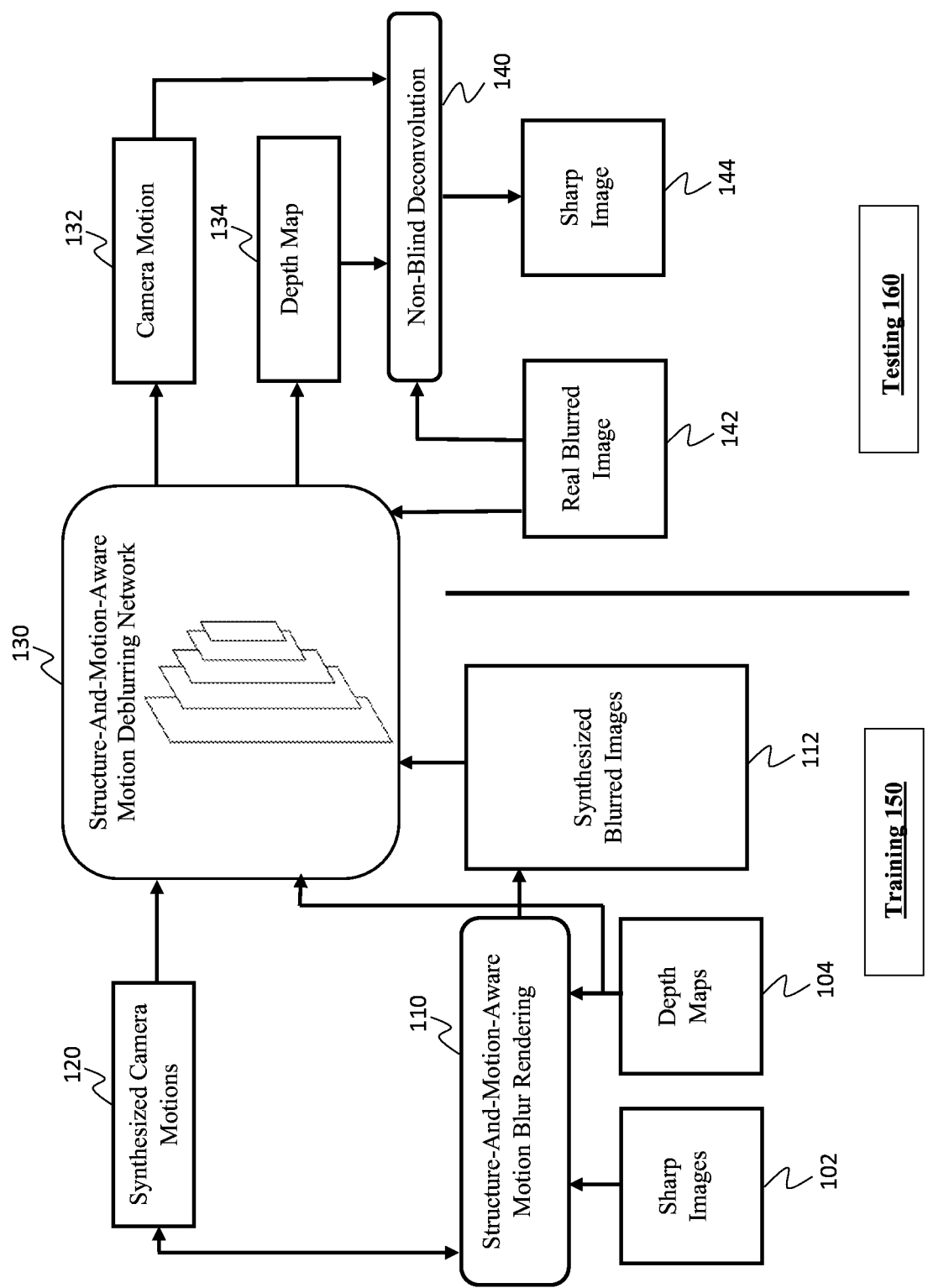
FIG. 1 is a block/flow diagram of a structure-and-motion-aware blur rendering and a structure-and-motion-aware deblurring network, in accordance with embodiments of the present invention.

FIG. 1 is a block/flow diagram of a structure-and-motion-aware blur rendering and a structure-and-motion-aware deblurring network, in accordance with embodiments of the present invention.

FIG. 1 illustrates the structure-and-motion-aware blur rendering and structure-and-motion-aware deblurring network. During the training phase 150, a set of sharp images 102, the corresponding depth maps 104, and the synthesized intra-frame camera motion 120 are used by the proposed structure-and-motion-aware blur rendering pipeline 110 to synthesize blurred images 112. The blurred images 112 are then used as input data, while the camera motions 120 and depth maps 104 are then used as supervision signals for training the proposed structure-and-motion-aware deblurring network 130. At testing phase 160, a single real blurred image 142 is input to the network. The network predicts both camera motion 132 and depth map 134 corresponding to the blurred image 142. Finally, the blurred image 142, camera motion 132, and depth map 134 are sent to the non-blind deconvolution module 140 to remove blur effects and output the sharp image 144.

Figure 2:
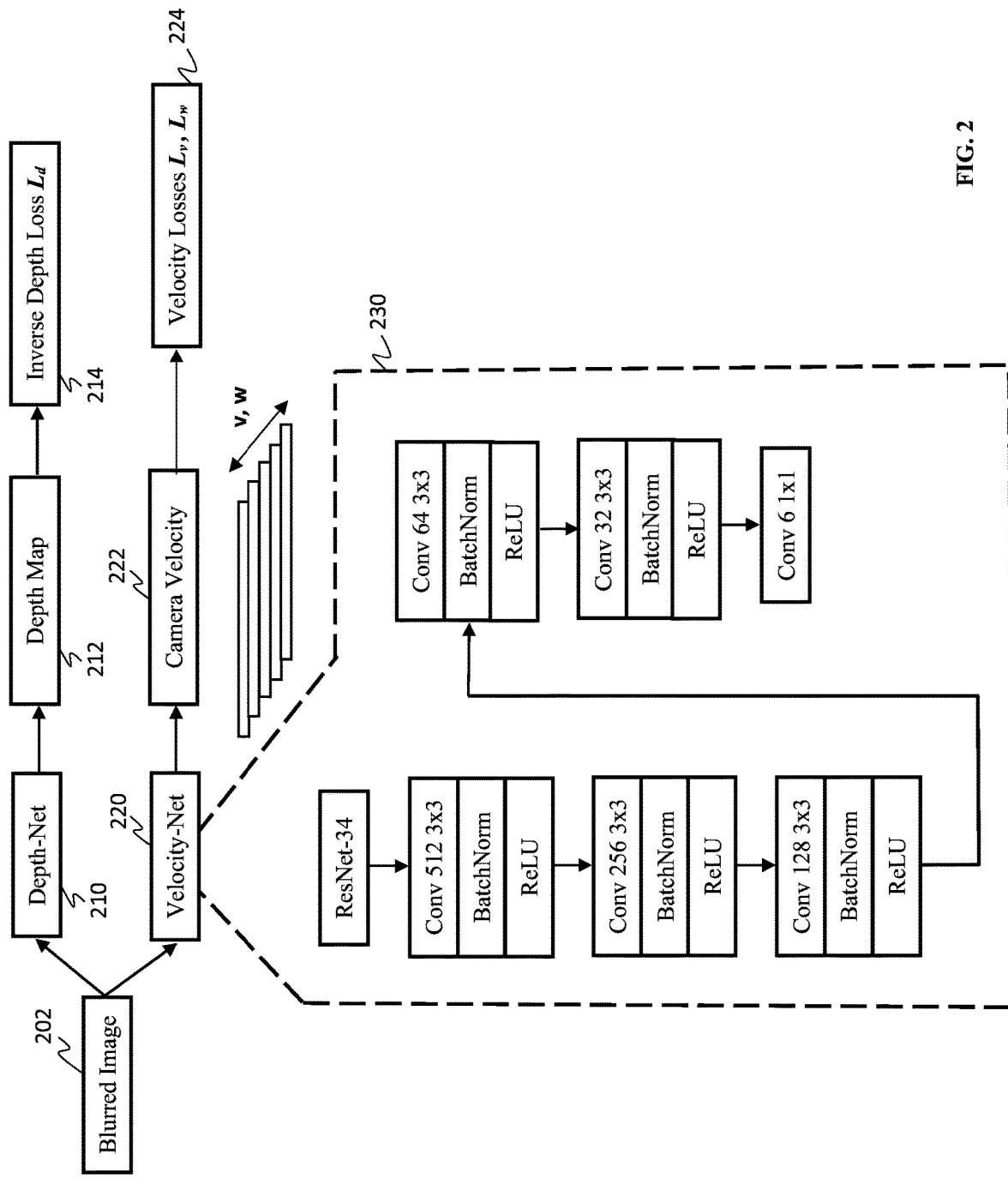
FIG. 2 is a block/flow diagram illustrating an architecture of a structure-and-motion-aware deblurring network, in accordance with embodiments of the present invention.

FIG. 2 is a block/flow diagram illustrating an architecture of a structure-and-motion-aware deblurring network, in accordance with embodiments of the present invention.

FIG. 2 illustrates the detailed architecture of the structure-and-motion-aware deblurring network. The network includes two sub-networks, namely Depth-Net 210 and Velocity-Net 220, for learning depth map 212 and camera motion 222, respectively, from a single blurred image 202. The DispNet is adopted (or any suitable neural network for single-view depth estimation) as the Depth-Net 210 for depth estimation from a blurred image 202. For the Velocity-Net 220, the ResNet-34 (230) is adopted (or any suitable neural network for feature extraction) by removing the last average pooling layer and adding five 3×3 convolutional layers (each followed by a BatchNorm layer and ReLU activation layer) for extracting features and one 1×1 convolutional layer (with no bias) for regressing a full 6D camera velocity, namely a 3D translational velocity vector v and 3D angular velocity vector w.

The Depth-Net 210 is trained by using a regression loss $L_d$ (214). The method regresses inverse depth (instead of depth) to account for increasing uncertainty with increasing depth. For the Velocity-Net 220, the training losses include regression losses $L_v$ and $L_w$ (224) for evaluating the estimated translational and angular velocity, respectively. The method uses L1 norm for all the above losses. Note that the two sub-networks 210, 220 are trained separately since the method relies on synthetic training data, which have ground truth available for supervision of each sub-network. Furthermore, the method can use a single joint network for predicting both depth map 212 and camera velocity 222 or use a more complicated camera motion model such as a polynomial model.

FIG. 3 is a block/flow diagram of an application of the deblurring method to simultaneous localization and mapping (SLAM) with blurred videos, in accordance with embodiments of the present invention.

The application of the deblurring method to SLAM with blurred videos is shown in FIG. 3. An input blurred video 310 is a set of consecutive image frames that have blur effects. Each frame is then passed respectively to the proposed deblurring method (e.g., structure-and-motion-aware deblurring 320) for removing blur effects and obtaining the corresponding sharp frame. The sharp frames 330 are then sent to an SLAM module 340 for estimating the camera trajectory and scene structures 350 observed in the video.

FIG. 4 is a block/flow diagram of an application of the deblurring method to structure from motion (SFM) with blurred images, in accordance with embodiments of the present invention.

The application of the deblurring method to SFM with blurred images is depicted in FIG. 4. An unordered set of blurred images 410 such as those obtained from Google Image Search can be used as input for SFM with blurred images. Each image is then passed separately to the proposed deblurring method (e.g., structure-and-motion-aware deblurring 420) for removing blur effects and obtaining the corresponding sharp image 430. The sharp images 430 are then sent to an SFM module 440 for estimating the camera poses and scene structures 450 observed in the images.

Figure 5:
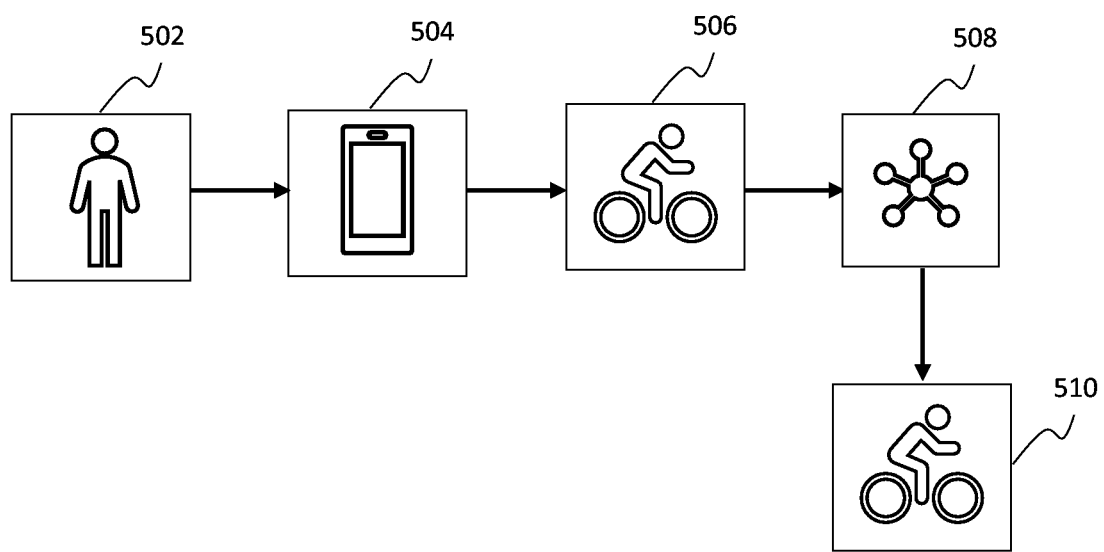
FIG. 5 is a block/flow diagram of an example practical application of the structure-and-motion-aware deblurring network, in accordance with embodiments of the present invention.

FIG. 5 is a block/flow diagram of an example practical application of the structure-and-motion-aware deblurring network, in accordance with embodiments of the present invention.

In one practical application, a user 502 employs a capturing device 504, such as a camera, to capture an image 506. The image 506 can be blurred. The CNN architecture 508 of the present invention can be employed to estimate and remove the blur effects from the captured image 506. The CNN architecture 508 then enables a sharp image 510 to be output to the user 502. Therefore, with the increasing popularity of lightweight imaging devices such as cellphone cameras and onboard cameras, blur has become prevalent in photography. In many cases, blur effects are caused by camera motion during image exposure. The present invention focuses on estimating and removing blur effects due to intra-frame camera motion in a single input blurred image using convolution neural networks (CNNs). Since motion blur is closely coupled with both the scene depth and intra-frame camera motion, removing blur in a geometrically faithful way requires to recover both structure and motion. Here, the exemplary embodiments of the present invention introduce a CNN framework to simultaneously recover the scene depth and intra-frame camera velocity from just one single blurred image. In addition, the exemplary invention also introduces a procedure for synthesizing realistic blurred images, which can be used for training CNNs. Lastly, the exemplary embodiments demonstrate the applications of the present invention towards the goals of Structure-From-Motion (SFM) with blurred images, as well as Simultaneous Localization And Mapping (SLAM) with blurred videos, which has wide applications in virtual reality/augmented reality (VR/AR), robotics, and autonomous driving, etc.

Figure 6:
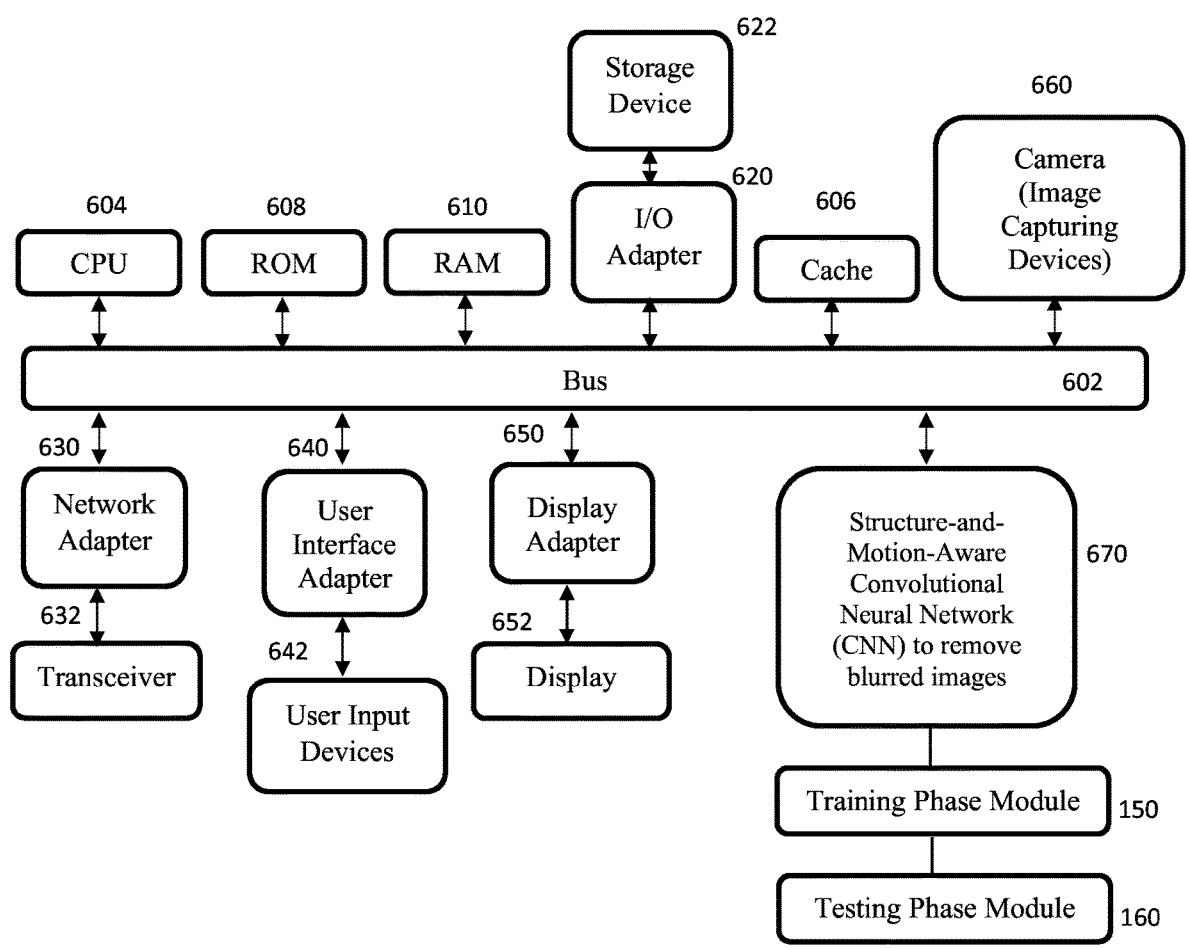
FIG. 6 is block/flow diagram of an exemplary processing system for correcting blur effects, in accordance with embodiments of the present invention.

FIG. 6 is block/flow diagram of an exemplary processing system for correcting blur effects, in accordance with embodiments of the present invention.

The processing system includes at least one processor or processor device (CPU) 604 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. One or more cameras 660 can be connected to bus 602. The cameras 660 can employ a structure-and-motion-aware CNN 670 to remove the blurring effects by employing a training module 150 and a testing module 160.

A storage device 622 is operatively coupled to system bus 602 by the I/O adapter 620. The storage device 622 can be any of a disk storage device (e.g., a magnetic or optical disk storage device), a solid state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
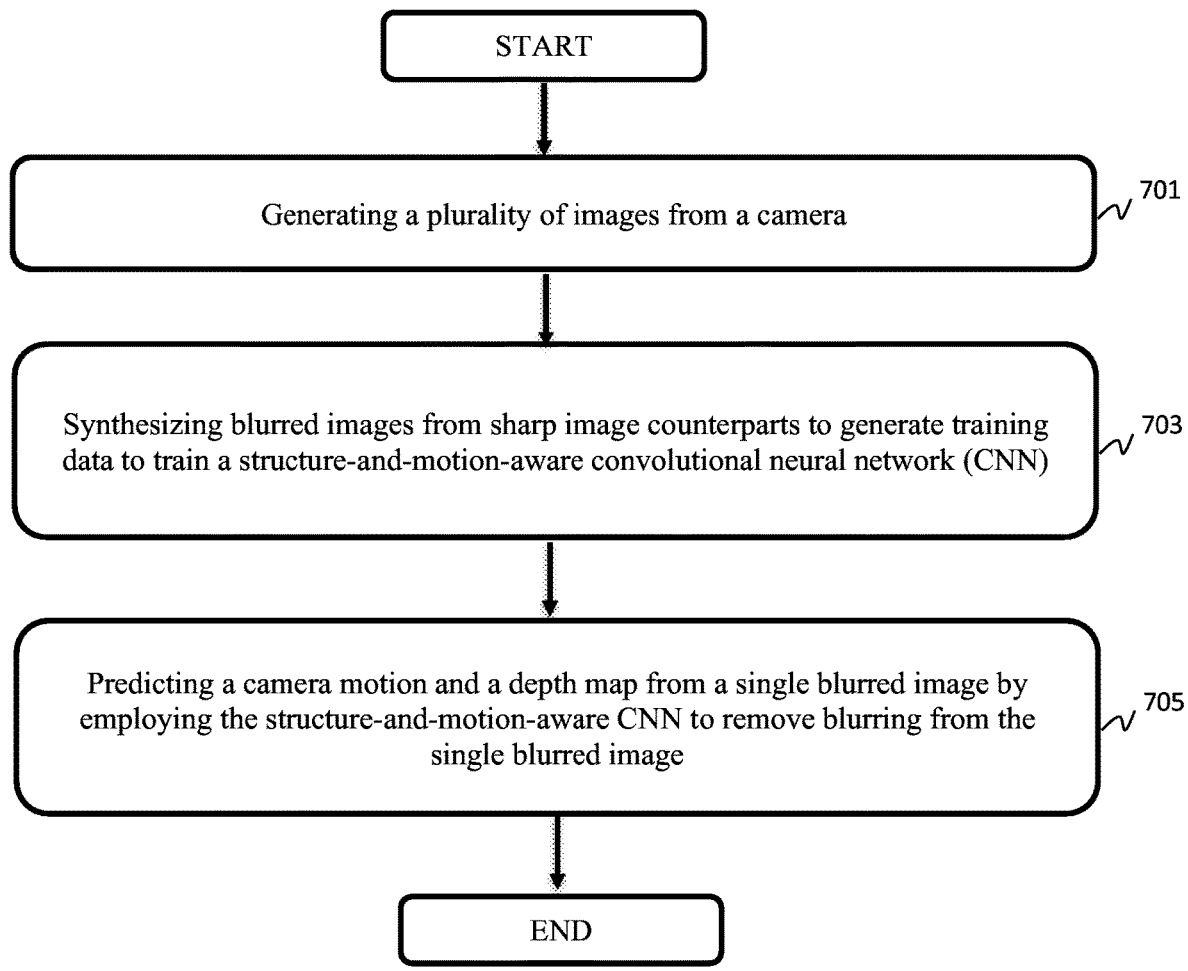
FIG. 7 is a block/flow diagram of an exemplary method for correcting blur effects, in accordance with embodiments of the present invention.

FIG. 7 is a block/flow diagram of an exemplary method for correcting blur effects, in accordance with embodiments of the present invention.

At block 701, generate a plurality of images from a camera.

At block 703, synthesize blurred images from sharp image counterparts to generate training data to train a structure-and-motion-aware convolutional neural network (CNN).

At block 705, predict a camera motion and a depth map from a single blurred image by employing the structure-and-motion-aware CNN to remove blurring from the single blurred image.

In summary, the exemplary embodiments of the present invention employ a full 6D camera motion model and take both camera motion and depth information into account during structure-and-motion-aware blur rendering as depicted in FIG. 1 that leads to more diverse and realistic synthesized blurred images. The innovation in simultaneous learning of camera motion and depth map in structure-and-motion-aware deblurring networks as shown in FIGS. 1 and 2 yields higher accuracy in deblurring. The exemplary structure-and-motion-aware deblurring module removes blur effects presented in blurred images/videos and enables SFM/SLAM methods designed for sharp images/videos to work on blurred images/videos as illustrated in FIGS. 4 and 5.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for correcting blur effects, the method comprising:
   generating a plurality of images from a camera;
   synthesizing blurred images from sharp image counterparts to generate training data to train a structure-and-motion-aware convolutional neural network (CNN); and
   simultaneously predicting a camera motion and a depth map from only a single blurred image by employing the structure-and-motion-aware CNN to remove blurring from the single blurred image, wherein deblurring involves non-uniform blur kernel estimation for each pixel individually and non-blind deblurring with the estimated blur kernel,
   wherein the structure-and-motion-aware CNN includes a depth network for learning a depth map and a velocity network for learning a camera motion, the depth network and the velocity network each receiving only the single blurred image as input, and the velocity network including a 1×1 convolutional layer for regressing a full 6D camera velocity represented as a 3D translational velocity vector and a 3D angular velocity vector.

2. The method of claim 1, further comprising, during a training phase, employing a set of sharp images, corresponding depth maps, and synthesized camera motions to generate synthesized blurred images by linear convolution.

3. The method of claim 2, further comprising providing the synthesized camera motions, the depth maps, and the synthesized blurred images to the structure-and-motion-aware CNN as supervision signals and input data, respectively, to train the structure-and-motion-aware CNN.

4. The method of claim 3, further comprising, during a testing phase, providing the single blurred image to the structure-and-motion-aware CNN to predict the camera motion and the depth map corresponding to the input blurred image.

5. The method of claim 4, further comprising transmitting the single blurred image, the camera motion, and the depth map to a non-blind deconvolution module to remove the blurred effects.

6. The method of claim 5, further comprising outputting a sharp image from the non-blind deconvolution module.

7. The method of claim 1, wherein the depth network is trained by a single regression loss and the velocity network is trained by an estimated translational regression loss and an angular velocity regression loss.

8. The method of claim 7, wherein the depth network is trained separately from the velocity network.

9. A non-transitory computer-readable storage medium comprising a computer-readable program for correcting blur effects, wherein the computer-readable program when executed on a computer causes the computer to perform the steps of:
generating a plurality of images from a camera;
synthesizing blurred images from sharp image counterparts to generate training data to train a structure-and-motion-aware convolutional neural network (CNN); and
simultaneously predicting a camera motion and a depth map from only a single blurred image by employing the structure-and-motion-aware CNN to remove blurring from the single blurred image, wherein deblurring involves non-uniform blur kernel estimation for each pixel individually and non-blind deblurring with the estimated blur kernel,
wherein the structure-and-motion-aware CNN includes a depth network for learning a depth map and a velocity network for learning: camera motion, the depth network and the velocity network each receiving only the single blurred image as input, and the velocity network including a 1×1 convolutional layer for regressing a full 6D camera velocity represented as a 3D translational velocity vector and a 3D angular velocity vector.

10. The non-transitory computer-readable storage medium of claim 9, wherein, during a training phase, a set of sharp images, corresponding depth maps and synthesized camera motions are employed to generate synthesized blurred images.

11. The non-transitory computer-readable storage medium of claim 10, wherein the synthesized camera motions, the depth maps, and the synthesized blurred images are provided to the structure-and-motion-aware CNN as supervision signals and input data, respectively, to train the structure-and-motion-aware CNN.

12. The non-transitory computer-readable storage medium of claim 11, wherein, during a testing phase, the single blurred image is provided to the structure-and-motion-aware CNN to predict the camera motion and the depth map corresponding to the input blurred image.

13. The non-transitory computer-readable storage medium of claim 12, wherein the single blurred image, the camera motion, and the depth map are transmitted to a non-blind deconvolution module to remove the blurred effects.

14. The non-transitory computer-readable storage medium of claim 13, wherein a sharp image is outputted from the non-blind deconvolution module.

15. The non-transitory computer-readable storage medium of claim 9, wherein the depth network is trained by a single regression loss and the velocity network is trained by an estimated translational regression loss and an angular velocity regression loss.

16. The non-transitory computer-readable storage medium of claim 15, wherein the depth network is trained separately from the velocity network.

17. A system for correcting blur effects, the system comprising:
a memory; and
one or more processors in communication with the memory configured to:
generate a plurality of images from a camera;
synthesize blurred images from sharp image counterparts to generate training data to train a structure-and-motion-aware convolutional neural network (CNN); and
simultaneously predict a camera motion and a depth map from only a single blurred image by employing the structure-and-motion-aware CNN to remove blurring from the single blurred image, wherein deblurring involves non-uniform blur kernel estimation for each pixel individually and non-blind deblurring with the estimated blur kernel,
wherein the structure-and-motion-aware CNN includes a depth network for learning a depth map and a velocity network for learning a camera motion, the depth network and the velocity network each receiving only the single blurred image as input, and the velocity network including a 1×1 convolutional layer for regressing a full 6D camera velocity represented as a 3D translational velocity vector and a 3D angular velocity vector.

18. The system of claim 17, wherein, during a training phase, a set of sharp images, corresponding depth maps and synthesized camera motions are employed to generate synthesized blurred images.

19. The system of claim 18, wherein the synthesized camera motions, the depth maps, and the synthesized blurred images are provided to the structure-and-motion-aware CNN as supervision signals and input data, respectively, to train the structure-and-motion-aware CNN.

20. The system of claim 19, wherein the depth network is trained by a single regression loss and the velocity network is trained by an estimated translational regression loss and an angular velocity regression loss.

* * * * *